(12) United States Patent
Tomik et al.

(10) Patent No.: US 10,995,029 B2
(45) Date of Patent: May 4, 2021

(54) METHOD AND APPARATUS FOR SHAPING GLASS SHEETS

(71) Applicant: PILKINGTON GROUP LIMITED, Lathom (GB)

(72) Inventors: John Stephan Tomik, Lasalle, MI (US); John Mark Welling, Perrysburg, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 15/576,959

(22) PCT Filed: May 27, 2016

(86) PCT No.: PCT/GB2016/051537
§ 371 (c)(1),
(2) Date: Nov. 27, 2017

(87) PCT Pub. No.: WO2016/189319
PCT Pub. Date: Dec. 1, 2016

(65) Prior Publication Data
US 2018/0155232 A1 Jun. 7, 2018

Related U.S. Application Data

(60) Provisional application No. 62/166,752, filed on May 27, 2015.

(51) Int. Cl.
*C03B 23/03* (2006.01)
*C03B 23/025* (2006.01)
*C03B 23/023* (2006.01)

(52) U.S. Cl.
CPC ............ *C03B 23/03* (2013.01); *C03B 23/023* (2013.01); *C03B 23/025* (2013.01); *C03B 2215/00* (2013.01); *C03B 2225/02* (2013.01)

(58) Field of Classification Search
CPC ...... C03B 23/03; C03B 23/023; C03B 23/025; C03B 2215/00; C03B 2225/02
See application file for complete search history.

(56) References Cited

U.S. PATENT DOCUMENTS 3,459,526 A    8/1969   Stickel et al.
4,204,853 A *   5/1980   Seymour ............. C03B 23/0256
                                                                                   65/104

(Continued)

FOREIGN PATENT DOCUMENTS

EP    1256552 A1   11/2002
JP    573725 A   1/1982

(Continued)

OTHER PUBLICATIONS

European Patent Office, International Search Report with Written Opinion, issued in PCT/GB2016/051537, dated Aug. 16, 2016, 15 pages, European Patent Office, Rijswijk, Netherlands.

*Primary Examiner* — Alison L Hindenlang
*Assistant Examiner* — Andrés E. Behrens, Jr.
(74) *Attorney, Agent, or Firm* — Marshall & Melhorn, LLC (57) ABSTRACT

The invention relates to a method for shaping a glass sheet comprising the steps (i) heating the glass sheet to a temperature suitable for shaping; (ii) depositing the glass sheet on a first bending tool for supporting the glass sheet thereon, the glass sheet being in a first position relative to the first bending tool; (iii) contacting an edge portion of the glass sheet such that the glass sheet is moved to a second position relative to the first bending tool; and (iv) shaping the glass sheet on the first bending tool. Positioning devices for moving a hot glass sheet during the method of the invention are described. A glass shaping line for carrying out the method is also described.

14 Claims, 6 Drawing Sheets

(56) References Cited

U.S. PATENT DOCUMENTS

| | | | |
|---|---|---|---|
| 4,406,685 A | 9/1983 | Jursa | |
| 4,432,782 A | 2/1984 | Seymour | |
| 4,437,872 A * | 3/1984 | McMaster | C03B 23/0252 65/104 |
| 4,609,391 A * | 9/1986 | McMaster | C03B 23/0252 65/104 |
| 4,666,492 A * | 5/1987 | Thimons | C03B 23/0302 294/65 |
| 4,775,404 A | 10/1988 | Klempner et al. | |
| 4,838,920 A | 6/1989 | Blasquez-Gonzales et al. | |
| 5,017,210 A | 5/1991 | Petitcollin et al. | |
| 5,066,321 A | 11/1991 | Kramer | |
| 5,078,776 A | 1/1992 | Kajii et al. | |
| 5,122,177 A | 6/1992 | Yoshizawa et al. | |
| 5,279,635 A | 1/1994 | Flaugher et al. | |
| 5,340,375 A * | 8/1994 | Anttonen | C03B 23/0252 65/104 |
| 5,346,526 A | 9/1994 | Flaugher et al. | |
| 5,660,609 A | 8/1997 | Muller et al. | |
| 5,672,189 A | 9/1997 | Funk | |
| 5,735,922 A * | 4/1998 | Woodward | B65G 49/067 65/104 |
| 5,743,931 A | 4/1998 | Flaugher et al. | |
| 5,755,845 A | 5/1998 | Woodward et al. | |
| 5,974,836 A | 11/1999 | Radermacher | |
| 6,422,040 B1 | 7/2002 | McMaster et al. | |
| 6,505,483 B1 | 1/2003 | Hoetzl et al. | |
| 6,918,268 B2 | 7/2005 | Fukai et al. | |
| 7,866,187 B2 | 1/2011 | Boisselle et al. | |
| 9,346,701 B2 | 5/2016 | King et al. | |
| 2007/0039354 A1 * | 2/2007 | Ollfisch | C03B 23/0252 65/106 |

FOREIGN PATENT DOCUMENTS

| | | |
|---|---|---|
| JP | 0859265 A | 3/1996 |
| JP | 2002338286 A | 11/2002 |
| JP | 2007506637 A | 3/2007 |
| WO | 2005033026 A1 | 4/2005 |

* cited by examiner

METHOD AND APPARATUS FOR SHAPING GLASS SHEETS

BACKGROUND OF THE INVENTION

The present invention relates to shaping glass sheets, especially using opposing bending tools that are moved toward and away from one another. The invention also relates to a positioning system used with a press bending station for the bending of heated glass sheets, with two bending tools that are moved toward one another.

Various processes are known for shaping or bending a sheet of glass. Typically a glass sheet is heated to a temperature where the glass sheet is deformable and the bending process carried out. In certain bending processes, the heated glass sheet is supported on a ring and allowed to sag under the influence of gravity, with or without the assistance of an additional pressing force. The ring may comprise two rings configured to bend the glass sheet in two bending phases, for example as described U.S. Pat. No. 5,660,609

Another known glass sheet bending process is a press bending process whereby a glass sheet (or a nested pair) is bent between a pair of complementary shaping members, usually in a spaced vertical relationship. Various configuration of shaping members are known for the pair of complementary shaping members, for example it is known to have a lower annular ring and an upper solid male, with examples provided in U.S. Pat. Nos. 5,279,635 and 5,755,845. U.S. Pat. No. 5,735,922 also describes a method and apparatus for press bending a glass sheet. In other versions of a press bending process, a split upper mould may be used with a lower annular ring, for example as described in U.S. Pat. No. 5,122,177 and US2015/0007612A1.

In one type of press bending process, a first bending tool may be designed as a ring-type female mould corresponding to a perimeter of a heated glass sheet to be bent, whilst an essentially solid male mould, also known as a full-faced mould, forms a second bending tool. To aid in the bending process a plurality of suction holes are placed in portions of the full-face mould, the position of which may be determined by a configuration of the annular mould and/or a geometry of the glass sheet to be bent, when the annular mould comes into contact with the heated glass sheet during the press bending process. The male mould may have a peripheral annular groove as described in U.S. Pat. No. 7,866,187B2 for applying suction therethrough.

The heated glass sheet to be bent is heated to the bending temperature in an associated furnace and moved between the full-faced mould and the ring-type mould while in a formable state. The heated glass sheet is typically transferred between the moulds using a series of rollers, a portion of which may move vertically to place the heated glass sheet onto the ring-type mould. At least two stops, which may be moved vertically to avoid interference with the full-faced mould, facilitate positioning the heated glass sheet in a direction of travel between the moulds. During or immediately after placing the heated glass sheet onto the ring-type mould, the full-faced mould and the ring-type mould are then moved toward one another to perform the pressing process. During the pressing process, the full-face mould presses the glass sheet onto the ring-type mould. It is understood however, that either the full-faced mould or the ring-type mould may be fixed and only the remaining mould will move. As a result, a shaping of the edges of the heated glass sheet takes place. Simultaneously, the middle area of the heated glass sheet is held against the moulding face using a vacuum to perform further shaping. These shaping procedures take place in a relatively quick manner, since the glass sheet cools down rapidly, and after a short time the edges of the glass sheet fall below an optimal bending temperature.

Following opening of, and removal from, the bending tools, the glass sheet should possess a desired shape, be dimensionally stable, and not be optically distorted. Otherwise, the bending process results in waste or products that possess poor quality. One such factor that may result in waste or products that possess poor quality is a positioning of the heated glass sheet on the ring-type mould during a press bending process of the type as hereinbefore described.

As mentioned hereinabove, vertically movable stops facilitate positioning the heated glass sheet in the direction of travel between the moulds. However, positioning of the heated glass sheet in other directions, such as substantially perpendicular to the direction of travel between the moulds, is only performed on the rollers, prior to entry of the glass sheet into the furnace. Consequently, alignment of the glass sheet during the bending process on the first bending tool may not be ideal, resulting in waste or products that possess poor quality.

Examples of glass positioning devices used in glass bending operations are described in U.S. Pat. Nos. 4,666,492, 4,838,920, 5,017,210 and 5,743,931.

In general, when a glass is supported on a first bending tool for bending thereon, if the glass sheet is not positioned correctly the glass sheet may not have the desired properties after bending. This is applicable for shaping a glass sheet by press bending or gravity sag bending.

SUMMARY OF THE INVENTION

It would be advantageous to develop a method for shaping a glass sheet and a glass shaping line that at least partially overcome the aforementioned problems. It would also be advantageous to develop a positioning device for hot glass sheets and a method for aligning hot glass sheets that facilitates accurate positioning of the sheets during a forming operation.

Accordingly the present invention provides from a first aspect a method for shaping a glass sheet comprising the steps (i) heating the glass sheet to a temperature suitable for shaping; (ii) depositing the glass sheet on a first bending tool for supporting the glass sheet thereon, the glass sheet being in a first position relative to the first bending tool; (iii) contacting an edge portion of the glass sheet such that the glass sheet is moved to a second position relative to the first bending tool; and (iv) shaping the glass sheet on the first bending tool.

In contrast to prior art methods, the position of the glass sheet is adjusted after being deposited on the first bending tool and before being shaped on the first bending tool. This has the advantage that the position of the glass sheet is adjusted late in the bending process, shortly before being shaped such that the time available for the glass sheet to deviate away from a target position on the first shaping tool is minimized.

In carrying out the method according to the first aspect of the present invention, step (ii) occurs before step (iii).

Preferably the first bending tool comprises at least one shaping rail having an upper shaping surface for supporting the glass sheet thereon.

Preferably the first bending tool comprises a ring configured to support the glass sheet in a peripheral region thereof. The ring may have a continuous upper shaping surface.

Preferably during step (iv), the glass sheet is shaped on the first bending tool by press bending the glass sheet between the first bending tool and a second bending tool.

As is known in the art, press bending is a shaping process in which a heat-softened glass sheet is pressed between complementary opposed shaping surfaces which are provided on press members such as first and second bending tools.

Embodiments where during step (iv), the glass sheet is shaped on the first bending tool by press bending the glass sheet between the first bending tool and a second bending tool have other preferable features.

Preferably during step (iv) the first bending tool does not move relative to a fixed reference point and the second bending tool moves relative to the fixed reference point towards the first bending tool to press bend the glass sheet between the first bending tool and the second bending tool.

Preferably during step (iv) the second bending tool does not move relative to a fixed reference point and the first bending tool moves relative to the fixed reference point towards the second bending tool to press bend the glass sheet between the first bending tool and the second bending tool.

Preferably during step (iv) both the first and second bending tools move towards each other to press bend the glass sheet between the first bending tool and the second bending tool.

Preferably during step (iv) the glass sheet is shaped on the first bending tool by moving the first bending tool with the glass sheet thereon relative to the second bending tool to press at least one portion of the glass sheet between at least one portion of the first bending tool and at least one portion of the second bending tool.

Preferably the second bending tool has a convex shaping surface and the first bending tool has a complementary concave shaping surface.

Preferably the second bending tool is a full-faced mould.

Preferably the second bending tool comprises at least two portions (a first portion and a second portion), more preferably wherein the first portion of the second bending tool is movable with respect to the second portion of the second bending tool. Preferably one part of the glass sheet is shaped between the first bending tool and the first portion of the second bending tool, and another part of the glass sheet is shaped between the first bending tool and the second portion of the second bending tool.

Preferably during step (iv) a vacuum is applied through one or more opening in the surface of the second bending tool.

In other embodiments during step (iv) the glass sheet is shaped by sagging under the influence of gravity whilst being supported on the first bending tool, optionally with the provision of an additional pressing force to shape selective areas of the glass sheet.

Other embodiments have other preferable features.

Preferably during step (ii), the glass sheet is deposited on the first bending tool by moving the first bending tool relative to the glass sheet.

Preferably during step (ii), the glass sheet is deposited on the first bending tool by dropping the glass sheet onto the first bending tool. The glass sheet may be being carried by a vacuum platen prior to being dropped onto the first bending tool. A suitable vacuum platen is described in U.S. Pat. No. 6,422,040B1. The glass sheet may be supported on a heated gas cushion prior to being dropped onto the first bending tool, for example as described in U.S. Pat. Nos. 4,432,782, 5,078,776 and 6,505,483B1.

Preferably prior to step (ii) there is a target position for the glass sheet relative to the first bending tool for optimum shaping, and the first position is deliberately offset from the target position such that after step (iii) the second position of the glass sheet relative to the first bending tool is closer to the target position than the first position of the glass sheet relative to the first bending tool.

Preferably there is a target position for the glass sheet relative to the first bending tool for optimum shaping, and the second position of the glass sheet is closer to the target position than the first position of the glass sheet.

Preferably during step (iii) a positioning device comprising a movable portion positioned adjacent the first bending tool, a fixed portion positioned adjacent the movable portion, and an actuator disposed between the fixed portion and the movable portion is provided such that upon engaging the actuator the movable portion is caused to move with respect to the fixed portion to contact the edge portion of the glass sheet and move the glass sheet from the first position to the second position.

At step (ii) when the glass sheet is deposited on the first bending tool, the glass sheet may bounce thereon such that the first position of the glass sheet with respect to the first bending tool is transient until the glass sheet stops bouncing on the first bending tool. Preferably during step (iii) there is no relative vertical movement between the glass sheet and the first bending tool. However the glass sheet may be moved to the second position during step (iii) whilst the glass sheet is bouncing on the first bending tool after having been deposited thereon.

Preferably the glass sheet is a single glass sheet or one sheet in a stack of glass sheets comprising at least two glass sheets.

Preferably the glass sheet is a glass sheet in a nested pair of glass sheets. Suitably the nested pair consists of an upper glass sheet and a lower glass sheet, preferably separated by a suitable parting agent such as calcium carbonate.

The method according to the first aspect of the present invention provides greater reproducibility of the position of the glass sheet on the first bending tool because any deviation of the position of the glass sheet on the first bending tool away from a target position thereon can be rectified accordingly. It will be readily apparent that if during step (ii) the glass sheet is deposited on the first bending tool such that adjustment of the position is not required, then the edge of the glass sheet may not be contacted. In this situation there may be contact with the edge of the glass sheet provided the second position of the glass sheet relative to the first bending tool is the same, or substantially the same, as the first position of the glass sheet relative to the first bending tool.

From a second aspect the present invention provides a positioning device for a hot glass sheet comprising a movable portion positioned adjacent a bending tool of a glass sheet bending operation; a fixed portion positioned adjacent the movable portion; and an actuator disposed between the fixed portion and the movable portion, wherein in response to engagement of the actuator, the movable portion contacts an edge of the glass sheet to adjust a position thereof.

Preferably the movable portion comprises a pusher portion.

Preferably the pusher portion is formed from a sheet metal.

Preferably the pusher portion is formed from a spring steel.

Preferably the pusher portion includes a contact material coupled thereto. Preferably the contact material is disposed on a pushing edge of the pusher portion.

Preferably a cross-sectional shape of the pusher portion is flat.

Preferably a cross-sectional shape of the pusher portion includes an undulation.

Preferably a cross-sectional shape of the pusher portion includes two undulations.

Preferably the undulations of the cross-sectional shape are laterally positioned.

In some embodiments the movable portion is movably coupled to the fixed portion.

In some embodiments the movable portion comprises a pusher mount portion and a pusher portion, the pusher portion coupled to the pusher mount portion.

From a third aspect the present invention provides a method for aligning hot glass sheets, comprising the steps of providing a glass bending operation, the glass bending operation including a first bending tool; providing a positioning device comprising a movable portion positioned adjacent the first bending tool, a fixed portion positioned adjacent the movable portion, and an actuator disposed between the fixed portion and the movable portion; disposing the hot glass sheet on the first bending tool; engaging the actuator to cause the movable portion to move with respect to the fixed portion; and contacting an edge of the glass sheet with the movable portion to adjust a position of the hot glass sheet with respect to the first bending tool.

Preferably the movable portion comprises a pusher portion.

Preferably the movable portion comprises a pusher portion formed from a spring steel.

Preferably the pusher portion and/or the movable portion includes a contact material coupled thereto. Preferably the contact material is disposed on a pushing edge of the pusher portion.

Preferably a cross-sectional shape of the pusher portion and/or the movable portion includes an undulation.

Preferably the cross-sectional shape of the pusher portion and/or the movable portion includes two undulations.

Preferably the step of providing the glass bending operation includes providing the first bending tool and a second bending tool.

Embodiments of the third aspect of the present invention where the glass bending operation includes providing the first bending tool and a second bending tool have other preferable features.

Preferably the movable portion comprises a pusher portion and a thickness of the pusher portion is less than a minimum distance between the first bending tool and the second bending tool.

Preferably the method of the third aspect of the present invention further comprises after the step of disposing the hot glass sheet on the first bending tool, the step of moving one of the first bending tool and the second bending tool towards a remaining one of the first bending tool and the second bending tool after the step of disposing the hot glass sheet on the first bending tool.

Preferably the movable portion comprises a pusher portion having a cross-sectional shape including an undulation, and the step of moving one of the first bending tool and the second bending tool towards a remaining one of the first bending tool and the second bending tool compresses the pusher portion therebetween.

Preferably the method of the third aspect of the present invention further comprises after the step of disposing the hot glass sheet on the first bending tool, the step of moving the first bending tool towards the second bending tool whilst the second bending tool is moving towards the first bending tool.

Preferably the movable portion comprises a pusher portion having a cross-sectional shape including an undulation, and the step of moving the first bending tool towards the second bending tool whilst the second bending tool is moving towards the first bending tool compresses the pusher portion therebetween.

The present invention also provides from a fourth aspect a positioning device for a hot glass sheet comprising a movable portion positioned adjacent a bending tool of a glass sheet bending operation; a tilting post mount having a tilt point, the tilting post mount positioned adjacent the movable portion; a first actuator disposed between the fixed portion and the movable portion; and a second actuator disposed between portions of the tilting post mount, wherein in response to engagement of the first actuator the movable portion contacts an edge of the glass sheet to adjust a position thereof and in response to engagement of the second actuator the movable portion and a portion of the tilting post mount are moved about the tilt point.

The present invention also provides from a fifth aspect a glass shaping line for shaping a glass sheet comprising a furnace for heating the glass sheet to a temperature suitable for shaping; conveyor means for conveying the glass sheet through the furnace; and a glass sheet shaping section comprising a first bending tool for supporting the glass sheet thereon during a glass bending operation and at least one (a first) positioning device arranged relative to the first bending tool; characterised in that when a glass sheet is supported on the first bending tool the first positioning device is movable from a first configuration to a second configuration to contact an edge of the glass sheet on the first bending to adjust the position of the glass sheet on the first bending tool.

Upon adjusting the position of the glass sheet on the first bending tool, the position of the glass sheet on the first bending tool is moved from a first position relative to the first bending tool to a second position relative to the first bending tool.

Preferably the glass shaping line further comprises transfer means for transferring the glass sheet from the conveyor means onto the first bending tool. The transfer means is used to deposit the glass sheet on the first bending tool.

Preferably the transfer means comprise one or more roller and/or a vacuum platen and/or flotation on a heated gas cushion.

Preferably the first bending tool is configured as a ring to support the glass sheet in a peripheral region thereof.

Preferably the glass sheet shaping section comprises a second bending tool configured to co-operate with the first bending tool to shape the glass sheet therebetween.

Suitably the glass sheet shaping section is a press bending section comprising a pair of complementary shaping members.

In embodiments where the shaping section comprises a second bending tool, preferably the second bending tool comprises at least two portions (a first portion and a second portion). Preferably the first portion of the second bending tool is movable with respect to the second portion of the second bending tool.

In some embodiments the first positioning device is a positioning device according to the second aspect of the present invention or the fourth aspect of the present invention.

In some embodiments the glass shaping line comprises a plurality of positioning devices.

The present invention also provides from another aspect a method for aligning hot glass sheets, comprising the steps of providing a glass bending operation, the glass bending operation including a first bending tool; disposing the hot glass sheet on the first bending tool; engaging an actuator to cause a positioning device to move with respect to the first bending tool; and contacting an edge of the glass sheet with the positioning device to adjust a position of the hot glass sheet on the first bending tool.

The present invention also provides from another aspect an apparatus for press bending hot glass sheets comprising a first bending tool; a second bending tool shaped to co-operate with the first bending tool; a positioning device disposed adjacent at least one of the first bending tool and the second bending tool, wherein in response to engagement of the positioning device, the positioning device contacts an edge of a hot glass sheet disposed on one of the first bending tool and the second bending tool to adjust a position of the hot glass sheet.

BRIEF DESCRIPTION OF THE DRAWINGS

The present will now be described with reference to the following figures (not to scale) in which:

FIG. 4B shows a cross sectional view of the pusher portion of FIG. 4C in the direction towards the pushing edge;

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 1:
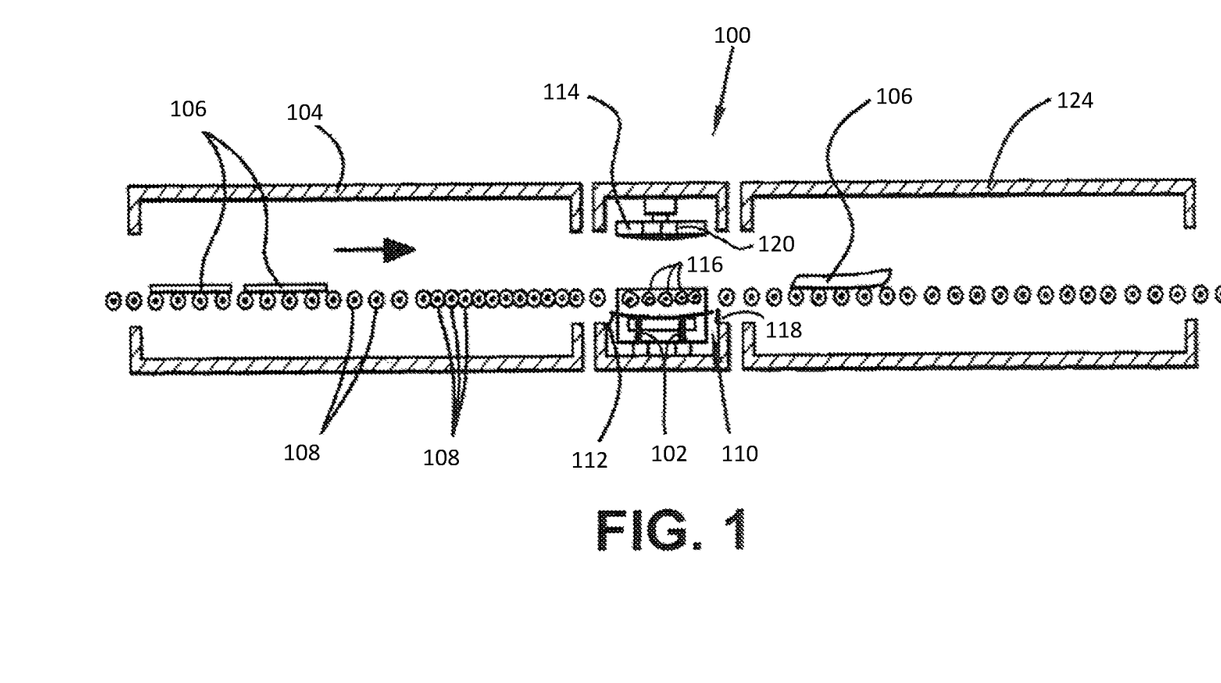
FIG. 1 is a schematic representation of a glass shaping line (a press bending operation) including a positioning device according to an embodiment of the invention.

FIG. 1 illustrates a press bending operation 100 including a positioning device 102 according to an embodiment of the invention. The press bending operation 100 includes a preheating furnace 104, which serves to preheat glass sheets 106. The glass sheets 106 are transported through the furnace 104 on rollers 108, a spacing of which is reduced in the area of the exit of the preheating furnace 104, since the glass sheets 106 in the heated state are deformable and therefore require greater support.

Figure 2:
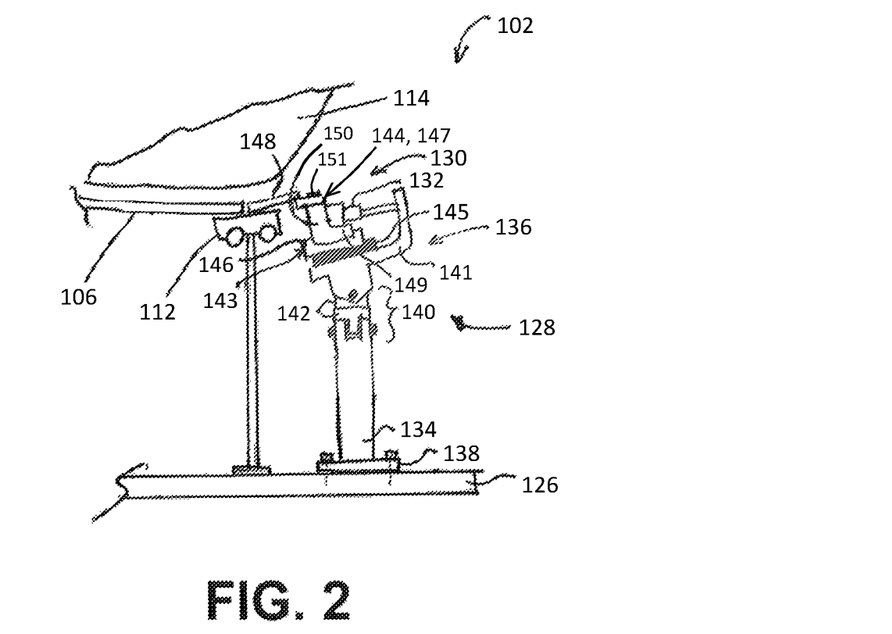
FIG. 2 shows a portion of a first bending tool having a positioning device adjacent thereto.

The preheating furnace 104 is followed by a bending station 110, which is provided with a first bending tool 112 and a second bending tool 114. As shown in FIGS. 1 and 2, the first bending tool 112 is a ring-type mould and the second bending tool 114 is a full-face mould. The bending station 110 includes a plurality of moveable rollers 116. The glass sheets 106 are transported onto the moveable rollers 116 from the rollers 108 as soon as the glass sheets 106 exit from the preheating furnace 104. At least two stops 118, which may be moved vertically to avoid interference with the second bending tool 114, facilitate positioning the glass sheets 106 in a direction of travel between the first bending tool 112 and the second bending tool 114. At least two positioning devices 102, the structure and operation of which are described hereinbelow, may be used to facilitate positioning a glass sheet 106 on the first bending tool 112 when the glass sheet is between the first bending tool 112 and the second bending tool 114.

After being transported onto the plurality of moveable rollers 116, the plurality of moveable rollers 116 are moved in a downward direction to facilitate positioning the glass sheet 106 on the first bending tool 112 i.e. the glass sheet 106 is deposited on the first bending tool 112. A timing of the movement of the plurality of moveable rollers 116 is performed to carefully position the glass sheet 106 against the stops 118. Alternately, it is understood that the first bending tool 112 may be moved in an upward direction, lifting the glass sheet 106 from a set of rollers configured to remain in a stationary position, thereby depositing the glass sheet 106 on the first bending tool 112.

Once the glass sheet 106 is positioned on the first bending tool 112, the first bending tool 112 and the second bending tool 114 begin moving towards one another to perform a press bending of the glass sheet 106. During movement of the first bending tool 112 and the second bending tool 114 towards one another, the positioning devices 102 are used to position the glass sheet 106 on the first bending tool 112; however, it is understood that the positioning devices 102 may be used to position the glass sheet 102 in any direction with respect to the first bending tool 112, such as positioning the glass sheets against the vertically movable stops (not shown). Following adjusting a position of the glass sheet 106 using the positioning devices 102, the glass sheet 106 is press bent between the first bending tool 112 and the second bending tool 114.

It will be immediately evident that the positioning devices may be used to position the glass sheet 106 on the first bending tool 112 whilst the first bending tool 112 and/or the second bending tool 114 are not moving and before the glass sheet has been press bent.

Also, for the avoidance of doubt, the first bending tool 112 may move towards the second bending tool 114, with the second bending tool not moving. Alternatively the second bending tool 114 may move towards the first bending tool 112, with the first bending tool 112 not moving. Alternatively the first bending tool 112 and the second bending tool 114 both are moving towards each other. In any of these alternatives the objective is to effect relative movement between the first bending tool 112 and the second bending tool 114 to press bend the glass sheet 106 between the first bending tool 112 and the second bending tool 114.

During pressing, a vacuum may be drawn on passages 120 formed in the second bending tool 114 to facilitate forming the glass sheet 106 into a desired shape. Upon completion of shaping the glass sheet 106, the glass sheet 106 may be released from the second bending tool 114 by way of positive pressure being applied through the passages 120 of the second bending tool 114.

It can be appreciated that the bending station 110 may comprise more than the bending tools 112, 114, may be oriented in a position other than the positions shown in FIGS. 1 and 2, have bending tools that are stationary, and still be within the scope and spirit of the invention. Upon completion of the bending process, a conveying device (not shown) serves to transport the shaped glass sheets 106 into a lehr 124. In the lehr 124, the shaped glass sheet 106 may be tempered or annealed as known in the art and cooled to a temperature at which handling can occur. The shaped glass sheet 106 may be used in the construction of a window for a vehicle, such as a windscreen, side window, sunroof or a rear window. Such a window may be monolithic or laminated.

Figure 3:
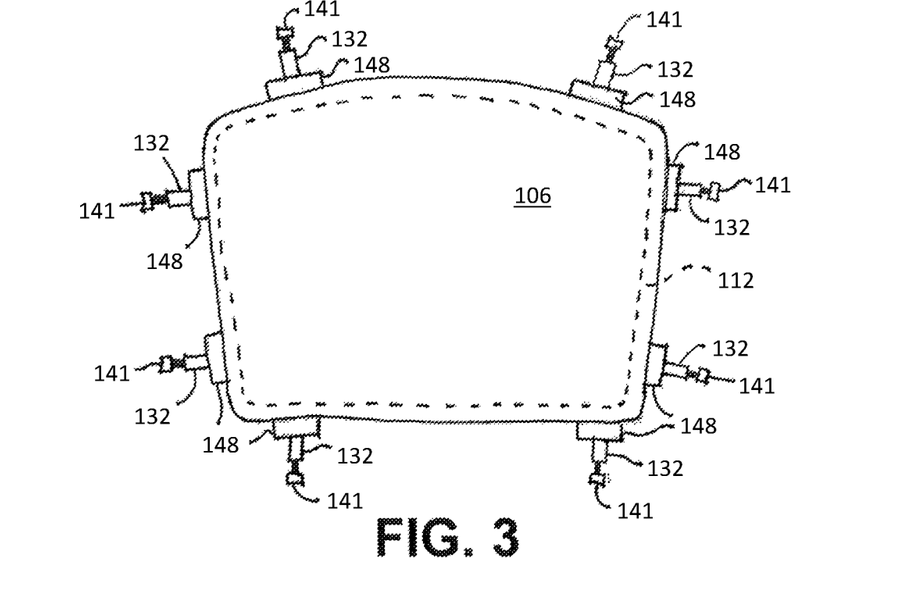
FIG. 3 shows a plan view of a first bending tool supporting a glass sheet thereon, with a plurality of positioning devices.

The positioning devices 102 are most clearly illustrated in FIGS. 2 and 3. Each of the positioning devices 102 is an assembly mounted on a platform 126. The platform 126 is a rigid plate onto which the first bending tool 112 is adjustably mounted; however, it is understood that the positioning devices 102 may be mounted in another manner, as long as such a manner ensures a predetermined spatial relationship between each of the positioning devices 102 and the first bending tool 112. Each of the positioning devices 102 includes a fixed portion 128, a moveable portion 130, and an actuator 132. As shown in FIG. 3, a plurality of positioning devices 102 may be disposed about a peripheral edge of the first bending tool 112 to facilitate positioning the glass sheet 106 with respect to the first bending tool 112 after the heat softened glass sheet has been deposited on the first bending tool 112 and before the glass sheet has been press bent.

The fixed portion 128 is a rigid member coupled to the platform 126. The fixed portion 128 is formed from a plurality of metal components welded together, but it is understood that the fixed portion 128 may comprise components coupled to one another using a plurality of fasteners or that the fixed portion 128 may be unitary in shape. The fixed portion 128 comprises a first end 134 and a second end 136. The first end 134 includes a flanged portion 138 which is removably coupled to the platform 126 using a plurality of fasteners; however, it is understood that the first end 134 may have other shapes and may be coupled to the platform 126 in any conventional manner. The second end 136 includes a pivot portion 140 and a mount portion 141. The pivot portion 140 comprises a pair of orthogonally arranged knuckle joints 142 which the mount portion 141 is coupled to; however, it is understood that the pivot portion 140 may comprise another structure which facilitates the mount portion 141 being pivotally coupled thereto. The mount portion 141 is a rigid member coupled to the pivot portion 140. As shown in FIG. 2, the mount portion 141 is a rigid L-shaped member extending away from the pivot portion 140; however, it is understood that the mount portion 141 may have other shapes that allow a mounting of the actuator 132 in a manner where the actuator 132 can effect movement on the moveable portion 130.

The moveable portion 130 is an assembly movably coupled to the mount portion 141. The moveable portion 130 is formed from a plurality of components coupled together using a plurality of fasteners, but it is understood that the moveable portion 130 may comprise components welded to one another. The moveable portion 130 comprises a slide portion 143 and a pusher assembly 144.

The slide portion 143 is a linear slide comprising a guide rail 145 and a bearing block 146 engaged with the guide rail 145. The guide rail 145 is coupled to the mount portion 141 and the bearing block 146 is coupled to the pusher assembly 144. The bearing block 146 facilitates linear movement of the pusher assembly 144 along the guide rail 145. Alternately, it is understood that moveable portion 130 may be movably coupled to the mount portion 141 in another manner.

The pusher assembly 144 includes a pusher member 147 and a pusher portion 148. The pusher portion 148 is removably coupled to the pusher member 147 to facilitate replacement of the pusher portion 148 if needed.

The pusher member 147 is a substantially S-shaped member having a mount portion 149, an intermediate portion 150, and a pusher mount portion 151. The pusher member 147 comprises a pair of rigid metal members coupled to one another; however, it is understood that the pusher member may be unitarily formed and formed from other materials. The mount portion 149 is coupled to the bearing block 146. A portion of the actuator 132 is coupled to the intermediate portion 150 to effect movement to the pusher member 147, and thus the pusher assembly 144. The pusher mount portion 151 is positioned adjacent the first bending tool 112 and provides a location for mounting the pusher portion 148. The pusher mount portion 151 may include at least one threaded aperture formed therein for receiving fasteners which removably couple the pusher portion 148 to the pusher mount portion 151; however, it is understood that the pusher mount portion 151 may be configured in any manner that allows the pusher portion 148 to be removably coupled to the pusher mount portion 151.

Figure 4A:
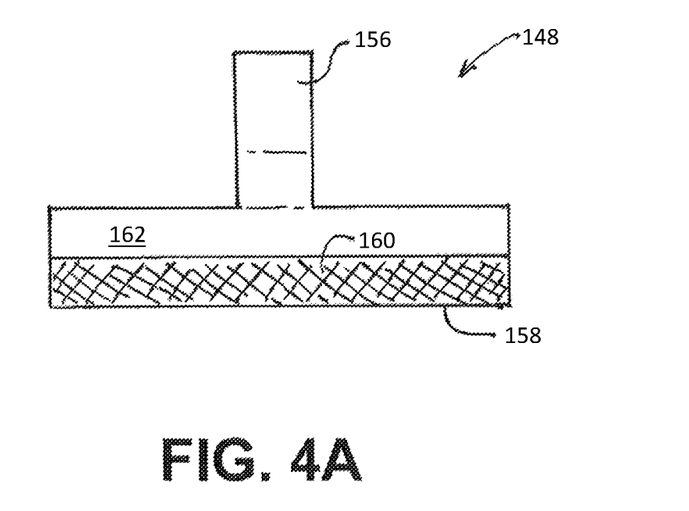
FIG. 4A shows a plan view of a pusher portion of a positioning device according to an embodiment of the present invention.

The pusher portion 148 is a semi-rigid member formed from a sheet metal, such as a spring steel; however, it is understood that other materials having similar properties may also be used. As shown in plan view in FIGS. 4A and 4C, the pusher portion 148 is substantially rectangular in shape and includes a mounting tab 156, a pushing edge 158, and a contact material 160. The mounting tab 156 extends from a remaining portion of the pusher portion 148 and may be offset to the remaining portion; however it is understood that the mounting tab 156 may have other shapes or that the pusher portion 148 may not include the mounting tab 156. The mounting tab 156 is unitarily formed with the pusher portion 148 and may include perforations formed therethrough for coupling the pusher portion 148 to the pusher mount portion 151. The pushing edge 158 is an edge of the pusher portion 148 that is positioned adjacent the first bending tool 112. As shown in FIGS. 4A and 4C, the pushing edge 158 is straight, however, it is understood that the pushing edge 158 may have an arcuate shape or another shape corresponding to a shape of an edge of the glass sheet 106.

The contact material 160 is piece of wire woven cloth coupled to a portion of an upward facing side 162 and the pushing edge 158 of the pusher portion 148. It is understood that the contact material 160 may be placed on any portion of the pusher portion 148 as long as placement of the contact material 160 does not interfere with either of the bending tools 112, 114 during use of the positioning device 102. In a preferred embodiment, the contact material 160 is formed from stainless steel wire cloth and is welded to the pusher portion 148; however, it is understood that the contact material 160 may be formed from other cloth-like materials, such as felt, that are softer than glass and suitable for use at high temperature. Further, it is understood that the contact material 160 may be coupled to the pusher portion 148 in any conventional manner, such as through the use of an adhesive or through the use of at least one fastener. A thickness of the semi-rigid member and the contact material 160 that form the pusher portion 148 is about equal to or thinner than a thickness of the glass sheet 106. Further, it is understood that the pusher portion 148 may not include the contact material 160 or that the contact material 160 may only be placed on the pushing edge 158.

It is also within the scope of the present invention that the pusher portion, including any contact material thereon, be thicker than the thickness of the glass sheet 106 providing the second bending tool 114 has suitable recessed portions therein to accommodate the thickness of the pusher portions when the first bending tool 112 and the second bending tool 114 are press bending the glass sheet 106.

Figure 4B:
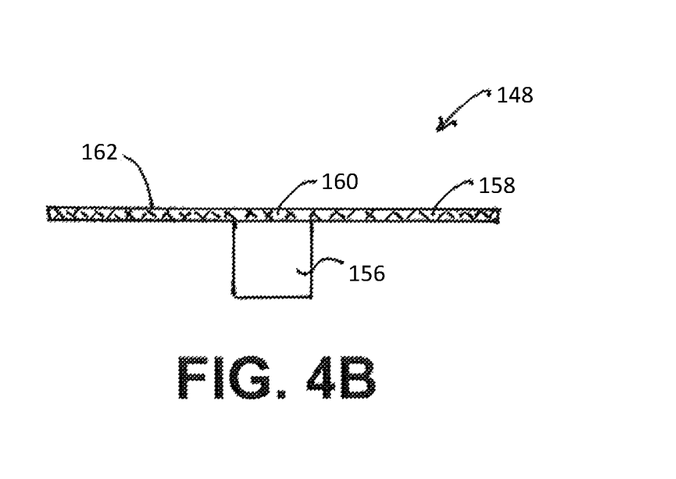
FIG. 4B shows a cross sectional view of the pusher portion of FIG. 4A in the direction towards the pushing edge.
Figure 4C:
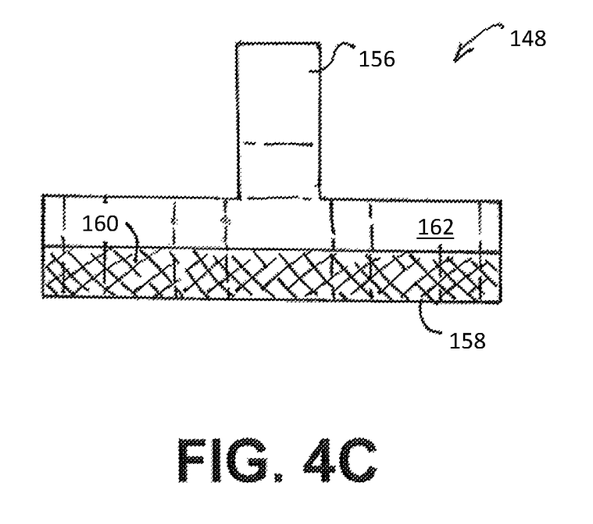
FIG. 4C shows a plan view of a pusher portion of a positioning device according to another embodiment of the present invention.
Figure 4D:
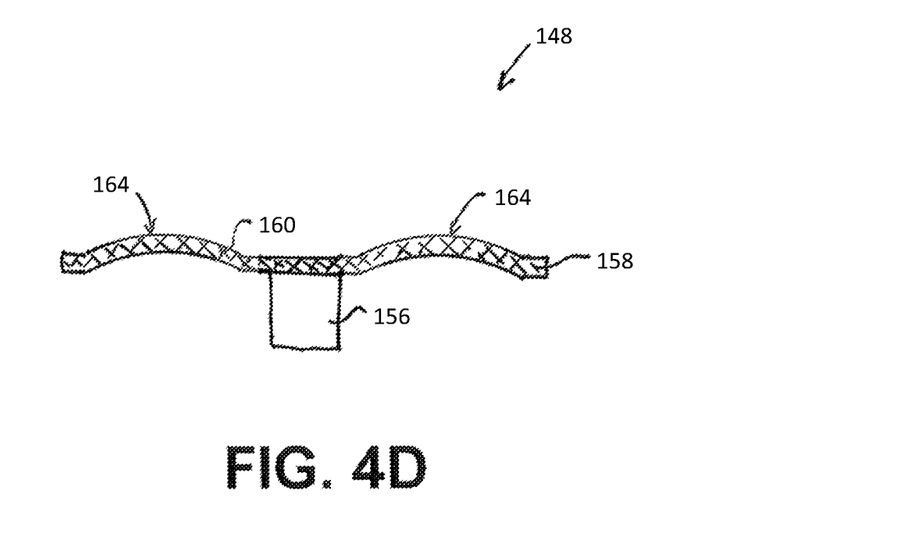

FIGS. 4B and 4D illustrate two cross-sectional shapes of the pusher portion 148 according to another embodiment of the invention.

The embodiment shown in FIGS. 4A and 4B has a flat cross-sectional shape. During the press bending process, a minimum distance between the first bending tool 112 and the second bending tool 114 may be about equal to or slightly greater than a thickness of the glass sheet 106. Because a thickness of the semi-rigid member and the contact material 160 that form the pusher portion 148 is about equal to or thinner than a thickness of the glass sheet 106, a presence of the pusher portion 148 adjacent the glass sheet 106 during the press bending process does not affect the press bending process.

The embodiment shown in FIGS. 4C and 4D has a cross-sectional shape that includes two laterally positioned undulations 164. During operation of the positioning device 102 including the pusher portion 148 having the laterally positioned undulations 164, it is understood that the undulations 164 facilitate pushing of the glass sheet 106 when dynamic conditions of the press bending process result in positional variances between successive glass sheets 106. Further, it is understood that the undulations 164 facilitate pushing of the glass sheet 106 when dynamic conditions of the press bending process result in a bouncing of a glass sheet 106 against the first bending tool 112. Further, dimensional variances between successive glass sheets 106 can also be accommodated for through use of the pusher portion 148 having the laterally positioned undulations 164. Lastly, during the press bending process, a minimum distance between the first bending tool 112 and the second bending tool 114 may be less than a height of the undulations 164, resulting in the pusher portion 148 being temporarily compressed.

The actuator 132 is a linear actuator that effects motion to the pusher assembly 144 with respect to the fixed portion 128 along the guide rail 145 in a path substantially parallel to an axis of the actuator 132. In response to movement of pusher assembly 144, the pusher portion 148 contacts and positions the glass sheet 106 on the first bending tool 112. In response to a signal from a controller or a control system (not shown), the actuator 132 increases in length, applying a force to the pusher assembly 144 and thus the pusher portion 148. The actuator 132 may be a pneumatic actuator, an electrical actuator, or any other type of linear actuator. The actuator 132 may be configured to be a double acting actuator to facilitate returning the pusher assembly 144 to a starting position. Alternately, it is understood that the actuator 132 or the positioning device 102 may be configured with a biasing member (not shown), such as a coil spring, for example, that returns the pusher assembly 144 to the starting position.

In use, the positioning devices 102 are used to position the glass sheet 106 between the first bending tool 112 and the second bending tool 114 when the glass sheet is on the first bending tool and before or during the press bending process. As mentioned hereinabove, the press bending operation 100 may be configured with moveable rollers 116 which are moved in a downward direction to facilitate positioning the glass sheet 106 on the first bending tool 112 or the platform 126 including the first bending tool 112 and the positioning devices 102 may be moved in an upward direction, lifting the glass sheet 106 from a set of rollers (not shown), wherein the set of rollers are configured to remain in a stationary position.

The platform 126 may be configured with a plurality of the positioning devices 102, based on a shape and alignment needs of the glass sheet 106. A process used to adjust a position of the glass sheet 106 using the positioning devices 102 happens in a very brief amount of time. As a non-limiting example, an amount of time used to adjust a position of the glass sheet 106 using the positioning devices 102 may be less than 0.3 seconds, that is about 0.28 seconds; however, it is understood that the amount of time may be adjusted to be smaller or greater based on a number of variables that are a part of the press bending process.

During movement of the first bending tool 112 and the second bending tool 114 towards one another, the positioning devices 102 are used to position the glass sheet 106 on the first bending tool 112. It is understood that the positioning devices 102 may be used to position the glass sheet 102 in any direction with respect to the first bending tool 112. In response to a signal from the controller or the control system (not shown), the actuator 132 increases in length, applying a force to the pusher assembly 144 and thus the pusher portion 148, causing the pushing edge 158 to contact the edge of the glass sheet 106. The force applied to the edge of the glass sheet 106 causes the glass sheet 106 to move on the first bending tool 112 to a location which minimizes positional variances between successive glass sheets 106 formed using the press bending operation 100. Following adjusting a position of the glass sheet 106 using the positioning devices 102, the pusher assembly 144 of the positioning device 102 returns to the starting position and the glass sheet 106 is press bent between the first bending tool 112 and the second bending tool 114. Alternatively for a suitably arranged positioning device and/or second bending tool, during the press bending operation the pusher assembly may remain in the configuration that caused the glass sheet to move on the first bending tool i.e. after the pusher portion 148 contacts and positions the glass sheet 106 on the first bending tool 112, the pusher portion 148 may remain in between the first bending tool 112 and the second bending tool 114. If the pusher portion 148 remains in between the first bending tool 112 and the second bending tool 114 during the press bending operation, as the curvature of the glass sheet is developed the pusher portion 148 may not be in contact with the glass sheet for the entire duration of the press bending operation.

Figure 5:
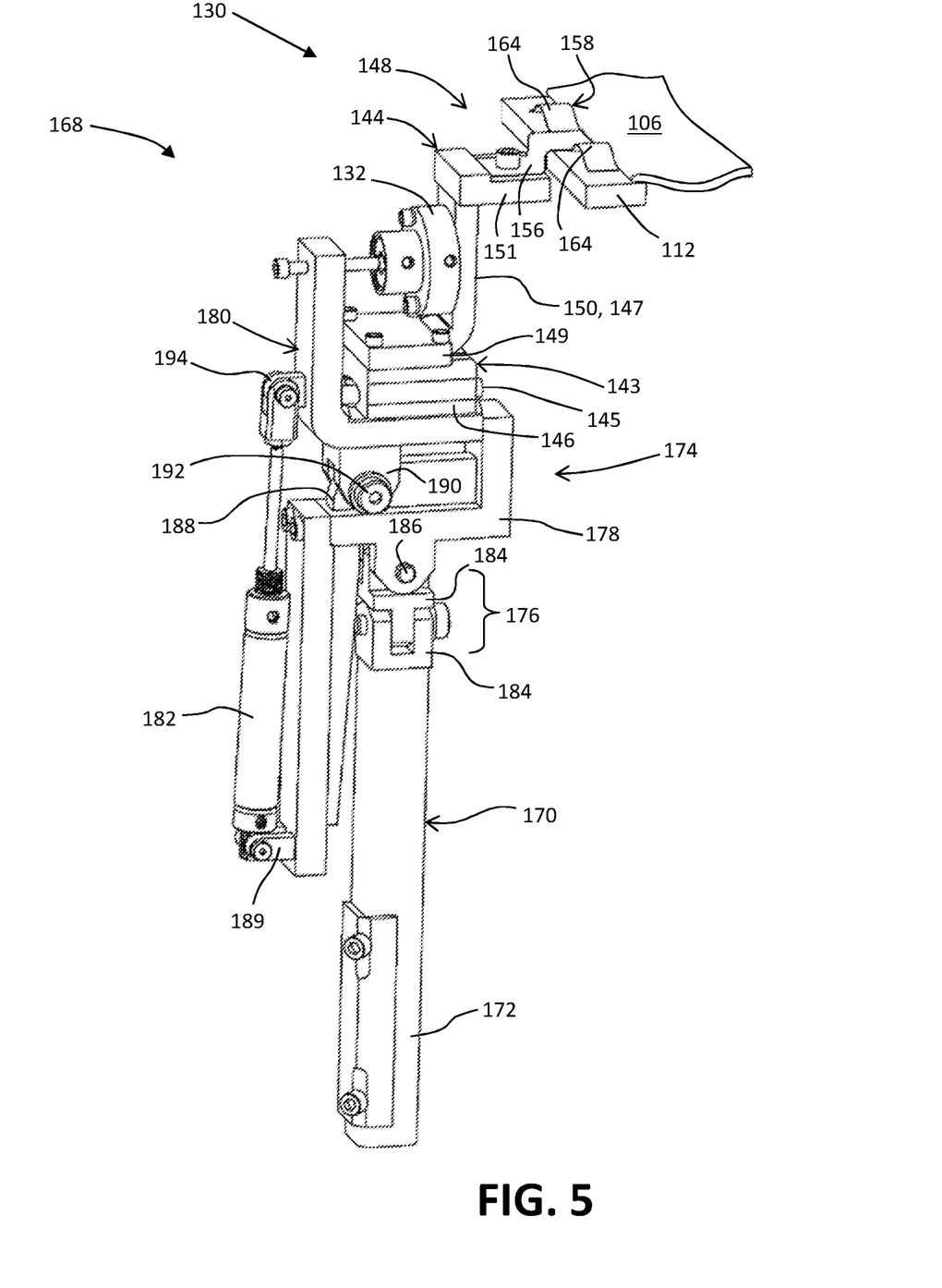
FIG. 5 shows a schematic isometric representation of a positioning device according to an embodiment of the invention.

FIG. 5 illustrates a positioning device 168 according to another embodiment of the invention. The embodiment shown in FIG. 5 includes similar components to the positioning device 102 illustrated in FIGS. 1-3. Similar structural features of the positioning device 168 include the same reference numeral, with the exception of the features described below. The positioning device 168 includes a tilting post mount 170, the moveable portion 130, and the actuator 132.

The tilting post mount 170 is an elongate assembly coupled to the platform 126. The tilting post mount 170 is formed from a plurality of components coupled together, but it is understood that the tilting post mount 170 may comprise components coupled to one another in any conventional manner. The tilting post mount 170 comprises a first end 172 and a second end 174. The first end 172 may include a flanged portion (not shown) which is removably coupled to the platform 126 using a plurality of fasteners; however, it is understood that the first end 172 may have other shapes and may be coupled to the platform 126 in any conventional manner. The second end 174 includes a pivot portion 176, a tilt mount portion 178, and a mount portion 180. An actuator 182 coupled to the tilt mount portion 178 facilitates movement of the mount portion 180 with respect to the tilt mount portion 178.

The pivot portion 176 comprises a pair of orthogonally arranged knuckle joints 184 which tilt mount portion 178 is coupled to; however, it is understood that the pivot portion 176 may comprise another structure which facilitates the tilt mount portion 178 being pivotally coupled thereto.

The tilt mount portion 178 is a rigid assembly pivotally coupled to the pivot portion 176 and the mount portion 180. The tilt mount portion 178 comprises a pair of metal members coupled to one another using a plurality of fasteners; however, it is understood that the members may be coupled to one another in any conventional manner, the tilt mount portion 178 may be unitarily formed, or the tilt mount portion 178 may be formed from other materials. As shown in FIG. 5, the tilt mount portion 178 is a rigid S-shaped assembly extending away from a pivot point 186 which adjustably joins the tilt mount portion 178 and the pivot portion 176; however, it is understood that the tilt mount portion 178 may have other shapes that allow a mounting of the actuator 182 and the mount portion 180 in a manner where the actuator 182 can effect movement on the mount portion 180. The tilt mount portion 178 includes a first tilt point 188 formed therein which pivotally joins the tilt mount portion 178 and the mount portion 180. The tilt mount portion 178 also includes a lower actuator mount 189 at a distal end thereof.

The mount portion 180 is a rigid member pivotally coupled to the tilt mount portion 178 at a second tilt point 190. A pin 192 disposed in both the first tilt point 188 and the second tilt point 190 allows pivotal movement therebetween. As shown in FIG. 5, the mount portion 180 is a rigid L-shaped member extending away from the tilt mount portion 178; however, it is understood that the mount portion 180 may have other shapes that allow a mounting of the actuator 132 in a manner where the actuator 132 can effect movement on the moveable portion 130. The mount portion 180 further includes an upper actuator mount 194 on a portion extending away from the tilt mount portion 178. The moveable portion 130 is configured with respect to the mount portion 180 in a similar manner as the moveable portion 130 is configured with respect to the mount portion 141 shown in FIG. 2.

The actuator 182 is a linear actuator that effects motion to the mount portion 180 with respect to the tilt mount portion 178 about the tilt points 188, 190 to move the pusher assembly 144 including the pusher portion 148 away from the first bending tool 112. The actuator 182 is coupled to the lower actuator mount 189 and the upper actuator mount 194. In response to a signal from a controller or a control system (not shown), the actuator 182 decreases in length, applying a force to the mount portion 180 to move the mount portion 180 about the tilt points 188, 190. The actuator 182 may be a pneumatic actuator, an electrical actuator, or any other type of linear actuator. The actuator 182 may be configured to be a double acting actuator to facilitate returning the mount portion 180 and the pusher assembly 144 to a starting position. Alternately, it is understood that the mount portion 180 or the pusher assembly 144 may be configured with a biasing member (not shown), such as a torsion spring, for example, that returns the mount portion 180 and the pusher assembly 144 to the starting position.

Alternatively for a suitably configured positioning device and/or second bending tool, the pusher assembly may remain in place during the press bending operation as hereinbefore described.

In use, the positioning device 168 is used to move the mount portion 180 including the pusher assembly 144 about the tilt points 188, 190 to move the pusher assembly 144 including the pusher portion 148 away from the first bending tool 112 during a portion of the press bending process. As mentioned hereinabove, the press bending operation 100 may be configured with moveable rollers 116 which are moved in a downward direction to facilitate positioning the glass sheet 106 on the first bending tool 112 or the platform 126 including the first bending tool 112 and the positioning devices 168 may be moved in an upward direction, lifting the glass sheet 106 from a set of rollers (not shown), wherein the set of rollers are configured to remain in a stationary position.

During movement of the first bending tool 112 and the second bending tool 114 towards one another, the positioning devices 168 are used to position the glass sheet 106 on the first bending tool 112 as described hereinabove with respect to the position device 102. Following adjusting a position of the glass sheet 106 using the positioning devices 168, the actuator 182 may be decreased in length in response to a signal from the control system, applying a force to the mount portion 180 to move the mount portion 180 about the tilt points 188, 190. Accordingly, the pusher assembly 144 including the pusher portion 148 is moved away from the first bending tool 112 during a portion of the press bending process. It is understood that a timing and an engagement of the actuator 182 may be performed to position the mount portion 180 as desired by an operator of the press bending operation 100 so that use of the positioning device 168 does not interfere with the press bending process.

FIGS. 6-11 illustrate steps involved in a method of shaping a glass sheet according to the present invention.

Figure 6:
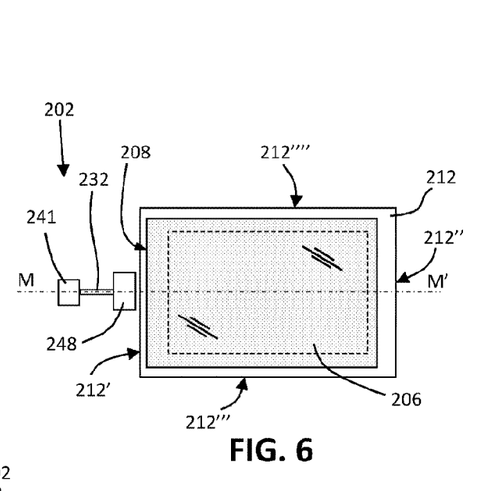
FIG. 6 shows a schematic plan view of a glass sheet supported on a first bending tool with a positioning device in a first configuration and the glass sheet in a first position relative to the first bending tool.
Figure 7:
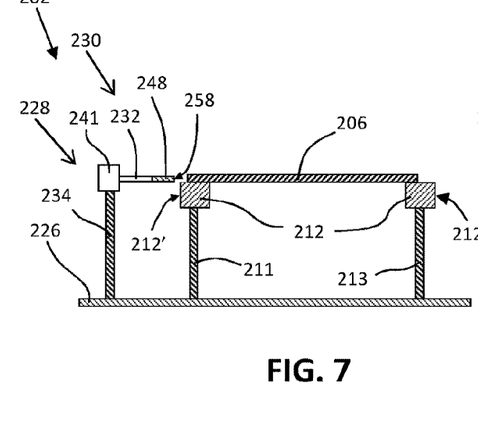
FIG. 7 shows a schematic side view of FIG. 6.

FIG. 6 shows a schematic plan view of a first bending tool 212 supporting a glass sheet 206. FIG. 7 shows a schematic side view of FIG. 6 through a cross-section along the line M-M'.

The first bending tool 212 is a ring mould having an upper shaping surface for supporting the glass sheet 206 thereon. The ring mould may also support a stack of glass sheets thereon, in particular a nested pair separated by a suitable parting agent such as calcium carbonate.

The first bending tool 212 in plan view has a rectangular outline or periphery configured to support a glass sheet 206 also having a rectangular outline. The first bending tool has a first side 212' and an opposite second side 212". Connecting sides 212' and 212" at one end thereof is a third side 212''' and at the other end thereof a fourth side 212'''' connects sides 212' and 212" thereby forming the rectangular outline as shown in FIG. 6. The first bending tool 212 may have other configurations in plan view outline. For example the first side 212' may not be parallel to the second side 212". Additionally, or instead of, the third side 212''' may not be parallel to the fourth side 212''''. The outline of the first bending tool may be trapezoidal, or have other forms suitably configured to support the particular glass sheet to be shaped. Any or all of the sides 212', 212", 212''' and 212'''' may be curved, for example as shown in FIG. 3.

The upper shaping surface of the first bending tool 212 is shown as flat in FIG. 7, but is typically configured to have at least a portion thereof having a complementary shape to a shaping surface of a second bending tool, where the glass sheet is press bent between the first bending tool and the second bending tool. Such a configuration is well known in the art.

The first bending tool 212 is mounted on a platform 226 (which is a rigid plate) by means of suitably configured struts 211 and 213, shown having equal length, but they may have different lengths. There may be more than two struts. Typically the struts 211, 213 are made from a rigid material such as steel and are able to withstand the hot environment.

At one end the strut 211 is mounted to the underside of the first shaping tool 212 (in the region of the first side 212') and at the other end the strut 211 is mounted to the platform 226. Likewise, at one end the strut 213 is mounted to the underside of the first shaping tool 212 (in the region of the second side 212") and at the other end the strut 213 is mounted to the platform 226.

The struts 211 are of equal length such that the upper shaping surface of the first bending tool 212 can be considered to be horizontally orientated.

Also mounted on the platform 226 is a positioning device 202 in a predetermined spatial relationship with the first bending tool 212. The positioning device 202 is mounted adjacent the first side 212' of the first bending tool 212.

The positioning device 202 includes a fixed portion 228 and a movable portion 230.

The fixed portion 228 includes a rigid strut 234 (i.e. of steel) mounted at one end to the platform 226 and at the other end to a mount portion 241. With reference to FIG. 2, the fixed portion 228 may be configured in the same way as the fixed portion 128.

The moveable portion 230 is an assembly coupled to the mount portion 241. An actuator 232, for example a linear actuator, has an end portion fixed to the mount portion 241 and an opposite end portion movable in a linear manner with respect to the mount portion towards (or away from) the first side 212'.

The movable portion of the actuator comprises a pusher portion 248 removably coupled thereto. Example pusher portions are of the type as described with reference to FIGS. 4A, 4B, 4C and 4D. Although not shown in the FIGS. 6-11, the movable portion of the actuator may comprise a pusher assembly including a pusher member, as described in relation to FIG. 2.

The pusher portion 248 in this example is a rectangular member of sheet metal having a first major surface and a second opposing major surface that faces the platform 226. Between the first and second major surfaces of the pusher portion 248 is a pushing edge 258 for contacting the edge 208 of the glass sheet 206. The thickness of the pusher portion (i.e. the separation of the first and second major surfaces of the pusher portion 248) is chosen to suitably contact the edge 208 of the glass sheet such that the glass sheet 206 is movable on the first bending tool 212.

The second major surface of the pusher portion 248 (and consequently the opposing first major surface of the pusher portion 248) is arranged such that the pusher member is able to pass over the upper surface of the first bending tool 212, as will be described in more detail hereinafter. It is preferred for there to be a space between the upper shaping surface of the first bending tool 212 and the second major surface of the pusher member 248 when the pusher member is above the upper shaping surface of the first bending tool 212.

In FIGS. 6 and 7, the glass sheet 206 has been heated (for example in a pre-heating furnace 104 as shown in FIG. 1) to a temperature suitable for shaping (for example between 590° C. and 670° C.) and is shown after having been deposited on the first bending tool 212. Accordingly the glass sheet 206 on the first shaping tool 212 may also be referred to as a heated glass sheet on the first shaping tool 212.

Although in FIG. 7 the glass sheet is shown as being flat, given that the glass sheet has been heated to a temperature suitable for shaping, the glass sheet when supported on the first bending tool 212 after being deposited thereon may sag under the influence of gravity such that the glass sheet 206 has slight curvature in directions parallel to and/or perpendicular to the line M-M'.

In this example the glass sheet 206 has a soda-lime-silicate composition. A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%. The glass composition may also contain other additives, for example, refining aids, which would normally be present in an amount of up to 2%.

The glass sheet 206 may have a thickness between 0.5 mm and 25 mm, typically a thickness between 0.5 mm and 8 mm.

The glass sheet 206 has a rectangular outline in plan view and has a first major surface and a second opposing major surface. The second major surface of the glass sheet faces the platform 226. As mentioned above, the glass sheet may have a different outline in plan view, with a suitable modified first bending tool 212.

Portions of the second major surface of the glass sheet 206 contact at least a portion of the upper shaping surface of the first bending tool 212 such that the glass sheet 206 is supported on the first bending tool 212.

FIGS. 6 and 7 show the glass sheet 206 in a first position relative to the first bending tool 212. After being deposited on the first shaping tool 212, the glass sheet may bounce thereon.

FIGS. 6 and 7 also show the positioning device in a first configuration, where the pusher member 248 is not in contact with the glass sheet 206 and is outboard of the periphery of the first bending tool 212 i.e. there is a space between the first side 212' and the pushing edge 258.

Figure 8:
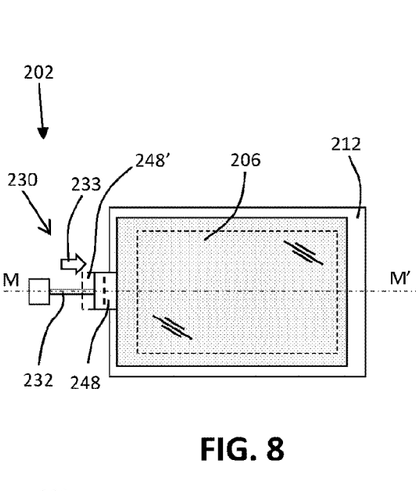
FIG. 8 shows the view of FIG. 6 with the positioning device in a second configuration and the glass sheet in a first position relative to the first bending tool.
Figure 9:
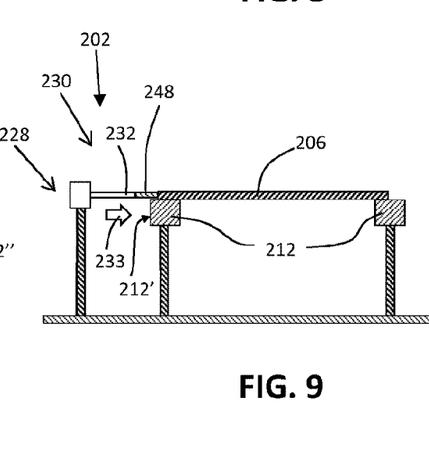
FIG. 9 shows a schematic side view of FIG. 8.

In FIGS. 8 and 9, the actuator 232 has been engaged (by suitable control means, not shown) such that the pusher portion 248 moves away from the mount portion 241 towards the first side 212' i.e. in the direction of arrow 233. Due to the configuration of the positioning device, the pusher portion 248 is able to pass over the upper surface of the first side 212'. A part of the second major surface of the pusher portion 248 faces the platform 226 and another part of the second major surface of the pusher portion 248 faces the upper surface of the first side 212'. The positioning device 202 is shown in a second configuration. The position of the pusher portion 248 when the positioning device 202 is in the first configuration is shown in phantom as element 248'.

In FIGS. 8 and 9, the pushing edge 258 of the pusher portion 248 has just made contact with the edge 208 of the glass sheet 206 such that the glass sheet is still in the first position relative to the first bending tool.

Figure 10:
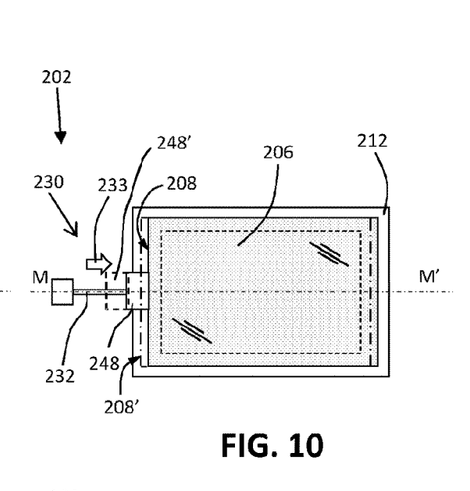
FIG. 10 shows the view of FIG. 6 with the positioning device in a third configuration and the glass sheet in a second position relative to the first bending tool.
Figure 11:
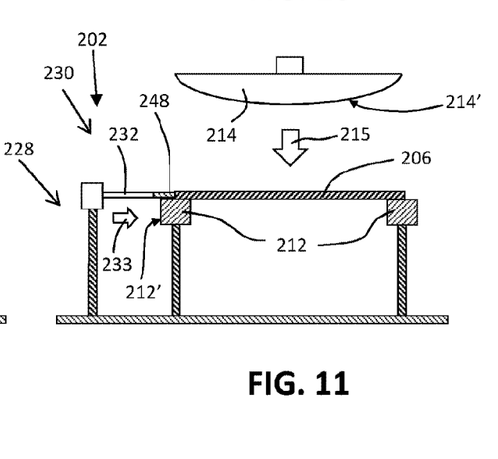
FIG. 11 shows a schematic side view of FIG. 10.

As shown in FIGS. 10 and 11, continued engagement of the actuator causes the pusher portion 248 to continue to move away from the mount portion 241 in the direction of arrow 233 to move the glass sheet 206 on the first bending tool 212. The glass sheet 206 is shown in a second position relative to the first bending tool 212. The positioning device 202 is shown in a third configuration. The position of the pusher portion 248 when the positioning device is in the first configuration is shown in phantom as element 248'. The position of the glass edge 208 has moved to a second position and the position of the glass edge 208 when the glass sheet is in the first position relative to the first bending tool is shown in phantom as 208'.

The actuator is disengaged at a suitable time when the glass sheet 206 has been moved to the second position relative to the first bending tool.

The glass sheet 206 in the second position relative to the first bending tool is then bent to the desired shape. In this example a second bending tool 214 is provided that has a convex shaping surface 214' to press bend the glass sheet 206 supported on the first bending tool 212. In this example the second bending tool 214 is a full-faced mould.

In FIGS. 10 and 11, the first bending tool 212 is static on platform 226 and the second bending tool 214 moves towards the first bending tool 212 in the direction of arrow 215 to press bend the glass sheet 206 between the first bending tool 212 and the second bending tool 214. For a fixed reference point, for example a point on the platform 226, the first bending tool 212 does not move relative thereto, but the second bending tool moves relative to the fixed reference point towards the first bending tool 212 to press bend the glass sheet 206.

However in an alternative embodiment to that shown, the second bending tool 214 is static and the first bending tool 212 is suitably mounted on the platform 226 to allow movement relative thereto such that the first bending tool 212 with the glass sheet 206 supported thereon may be moved in a direction counter to arrow 215 towards the static second bending tool 214, to press bend the glass sheet 206 between the first bending tool 212 and the second bending tool 214.

In another alternative, both the first bending tool 212 and the second bending tool 214 are movable towards each other to press bend the glass sheet 206 therebetween.

After the glass sheet 206 has been press bent between the first bending tool 212 and the second bending tool 214, a conveying device (not shown) serves to transport the shaped glass sheet into a lehr (for example lehr 124 as shown in FIG. 1) and may be tempered or annealed as known in the art and cooled to a temperature at which handling can occur. The shaped glass sheet 206 may be used in the construction of a window for a vehicle, such as a windscreen, side window, sunroof or a rear window. Such a window may be monolithic or laminated.

Although in FIGS. 6-11 only one positioning device 202 is shown adjacent the first side 212' of the first bending tool 212, there may be two or more positioning devices adjacent the first side 212' of the first bending tool 212.

Furthermore, there may be one or more positioning devices adjacent any or all of the other sides 212", 212''' and 212'''' for adjusting the position of the glass sheet on the first shaping tool 212.

In accordance with the provisions of the patent statutes, the present invention has been described in what is considered to represent its preferred embodiments, however, it should be noted that the invention can be practiced otherwise than as specifically illustrated and described without departing from its scope or spirit.

The invention claimed is:

1. A method for shaping a glass sheet having a first major surface, a second major surface opposing the first major surface, and an edge extending between the first and second major surfaces, comprising in sequence the steps:
   i. heating the glass sheet to a temperature suitable for shaping;
   ii. depositing the glass sheet on a first bending tool such that at least a portion of the second major surface contacts at least a portion of a shaping surface of the first bending tool to support the glass sheet on the first bending tool, the glass sheet being in a first position relative to the first bending tool;
   iii. contacting the edge of the glass sheet such that the glass sheet is moved to a second position relative to the first bending tool; and
   iv. shaping the glass sheet on the first bending tool.

2. The method according to claim 1, wherein the first bending tool comprises at least one shaping rail having an upper shaping surface for supporting the glass sheet thereon and/or wherein the first bending tool comprises a ring configured to support the glass sheet in a peripheral region thereof.

3. The method according to claim 1, wherein during step (iv), the glass sheet is shaped on the first bending tool by press bending the glass sheet between the first bending tool and a second bending tool.

4. The method according to claim 3, wherein during step (iv), the glass sheet is shaped on the first bending tool by moving the first bending tool with the glass sheet thereon relative to the second bending tool to press bend at least one portion of the glass sheet between at least one portion of the first bending tool and at least one portion of the second bending tool.

5. The method according to claim 3, wherein the second bending tool has a convex shaping surface and the first bending tool has a complementary concave shaping surface.

6. The method according to claim 3, wherein the second bending tool comprises at least two portions (a first portion and a second portion), wherein the first portion of the second bending tool is movable with respect to the second portion of the second bending tool.

7. The method according to claim 3, wherein during step (iv) a vacuum is applied through one or more opening in the surface of the second bending tool.

8. The method according to claim 1, wherein during step (iv) the glass sheet is shaped by sagging under the influence of gravity whilst being supported on the first bending tool, optionally with the provision of an additional pressing force to shape selective areas of the glass sheet.

9. The method according to claim 1, wherein during step (ii), the glass sheet is deposited on the first bending tool by moving the first bending tool relative to the glass sheet and/or by dropping the glass sheet onto the first bending tool.

10. The method according to claim 1, wherein prior to step (ii) there is a target position for the glass sheet relative to the first bending tool for optimum shaping, and the first position is deliberately offset from the target position such that after step (iii) the second position of the glass sheet relative to the first bending tool is closer to the target position than the first position of the glass sheet relative to the first bending tool, or the second position of the glass sheet is closer to the target position than the first position of the glass sheet.

11. The method according to claim 1, wherein during step (iii) a positioning device comprising a movable portion positioned adjacent the first bending tool, a fixed portion positioned adjacent the movable portion, and an actuator disposed between the fixed portion and the movable portion is provided such that upon engaging the actuator the movable portion is caused to move with respect to the fixed portion to contact the edge of the glass sheet and move the glass sheet from the first position to the second position.

12. The method according to claim 1, wherein during step (iii) there is no relative vertical movement between the glass sheet and the first bending tool and/or wherein the glass sheet is a single glass sheet or one sheet in a stack of glass sheets comprising at least two glass sheets.

13. The method of claim 1, wherein the edge of the glass sheet is contacted and thereby moves the glass sheet to the second position relative to the first bending tool while the glass sheet rests on and is supported by the first bending tool.

14. The method of claim 1, wherein the edge of the glass sheet is contacted and thereby moves the glass sheet to the second position relative to the first bending tool while the glass sheet is in direct contact with the first bending tool.

* * * * *